United States Patent
Williamson et al.

(10) Patent No.: US 10,844,210 B2
(45) Date of Patent: Nov. 24, 2020

(54) MODIFIED POLYETHYLENE RESINS AND METHOD FOR MAKING THE SAME

(71) Applicant: Dow Global Technologies LLC, Midland, MI (US)

(72) Inventors: Alexander Williamson, Rosharon, TX (US); Surya Ssubramaniam, Richmond, VA (US); Jorge C. Gomes, Sao Paulo (BR)

(73) Assignee: Dow Global Technologies LLC, Midland, MI (US)

( * ) Notice: Subject to any disclaimer, the term of this patent is extended or adjusted under 35 U.S.C. 154(b) by 110 days.

(21) Appl. No.: 16/086,548

(22) PCT Filed: Mar. 6, 2017

(86) PCT No.: PCT/US2017/020936
§ 371 (c)(1),
(2) Date: Sep. 19, 2018

(87) PCT Pub. No.: WO2017/172273
PCT Pub. Date: Oct. 5, 2017

(65) Prior Publication Data
US 2019/0100644 A1    Apr. 4, 2019

Related U.S. Application Data

(60) Provisional application No. 62/315,820, filed on Mar. 31, 2016.

(51) Int. Cl.
| | | |
|---|---|---|
| *C08J 5/18* | (2006.01) | |
| *C08K 5/14* | (2006.01) | |
| *C08L 23/26* | (2006.01) | |
| *C08L 23/06* | (2006.01) | |
| *C08L 23/04* | (2006.01) | |
| *C08L 23/08* | (2006.01) | |

(52) U.S. Cl.
CPC .............. *C08L 23/26* (2013.01); *C08J 5/18* (2013.01); *C08K 5/14* (2013.01); *C08L 23/04* (2013.01); *C08L 23/06* (2013.01); *C08L 23/0815* (2013.01); *C08J 2323/06* (2013.01); *C08L 2201/08* (2013.01); *C08L 2203/16* (2013.01); *C08L 2205/025* (2013.01); *C08L 2205/035* (2013.01); *C08L 2207/066* (2013.01); *C08L 2310/00* (2013.01)

(58) Field of Classification Search
CPC .......... C08L 23/26; C08L 23/04; C08L 23/06; C08L 23/08515; C08L 2201/08; C08L 2203/16; C08L 2205/025; C08L 2205/035; C08L 2207/066; C08L 2310/00; C08J 5/18; C08J 2323/06; C08K 5/14

See application file for complete search history.

(56) References Cited

U.S. PATENT DOCUMENTS

| | | |
|---|---|---|
| 3,003,000 A | 10/1961 | Milas |
| 3,645,992 A | 2/1972 | Dow |
| 3,914,342 A | 10/1975 | Mitchell |
| 4,076,698 A | 2/1978 | Anderson et al. |
| 4,352,915 A | 10/1982 | Mashita et al. |
| 4,599,392 A | 7/1986 | McKinney et al. |
| 5,272,236 A | 12/1993 | Lai et al. |
| 5,278,272 A | 1/1994 | Lai et al. |
| 5,582,923 A | 12/1996 | Kale et al. |
| 5,733,155 A | 3/1998 | Sagawa et al. |
| 5,854,045 A | 12/1998 | Fang et al. |
| 5,925,448 A | 7/1999 | Moy et al. |
| 6,445,642 B2 | 9/2002 | Murakami |
| 7,498,282 B2 | 3/2009 | Patel et al. |
| 7,776,987 B2 | 8/2010 | Oswald et al. |
| 7,812,094 B2 | 10/2010 | Kvamme et al. |
| 8,372,931 B2 | 2/2013 | Hermel-Davidock et al. |
| 8,664,337 B2 | 3/2014 | Mazzola et al. |
| 8,987,382 B2 | 3/2015 | Demirors et al. |
| 9,068,032 B2 | 6/2015 | Karjala et al. |
| 9,422,425 B2 | 8/2016 | Karjala et al. |
| 9,803,295 B2 | 10/2017 | Patel et al. |
| 9,908,956 B2 | 3/2018 | Effler et al. |
| 2004/0054097 A1 | 3/2004 | Maehling et al. |
| 2010/0292404 A1* | 11/2010 | Hampton .............. C08L 23/06 525/191 |
| 2011/0171407 A1 | 7/2011 | Mazzola et al. |

(Continued)

FOREIGN PATENT DOCUMENTS

| | | |
|---|---|---|
| JP | 2010144134 | 7/2010 |
| WO | 2006/045501 | 5/2006 |

(Continued)

OTHER PUBLICATIONS

PCT/US2017/020936, International Search Report and Written Opinion dated May 5, 2017.

(Continued)

*Primary Examiner* — Irina S Zemel
*Assistant Examiner* — Jeffrey S Lenihan

(57) ABSTRACT

A method for increasing the melt strength and/or low shear viscosity of a polyethylene resin, the method comprising: a) providing a first polyethylene resin having a density ranging from 0.900 g/cm$^3$ to 0.970 g/cm$^3$, a melt index ranging from 0.01 g/10 min to 30 g/10 min, and at least 0.20 vinyl groups per 1,000 total carbons; b) providing a masterbatch composition comprising a free radical generator and a second polyethylene resin, wherein the free radical generator has a half-life at 220° C. of less than 200 seconds, and a decomposition energy higher than −250 kJ/mol, and wherein the second polyethylene resin has a density ranging from 0.900 g/cm$^3$ to 0.970 g/cm$^3$, melt index ranging from 0.01 g/10 min to 100 g/10 min; and c) reacting the first polyethylene resin with the masterbatch composition to form a modified polyethylene resin.

15 Claims, 7 Drawing Sheets

(56) References Cited

U.S. PATENT DOCUMENTS

2014/0255674 A1   9/2014  Tice et al.
2015/0068943 A1   3/2015  Niedersuess et al.

FOREIGN PATENT DOCUMENTS

| WO | 2008/104371 A1 |   | 9/2008 |
|----|----------------|---|--------|
| WO | 2011085371     |   | 7/2011 |
| WO | 2013006409     |   | 1/2013 |
| WO | 2013101930     |   | 7/2013 |
| WO | 2014/051682    |   | 4/2014 |
| WO | WO-2015047841 A1 | * | 4/2015 |

OTHER PUBLICATIONS

Scaffaro, R. et al., European Polymer Journal, 2007, p. 2947-2955, vol. 43.
PCT/US2017/020936, International Preliminary Report on Patentability dated Oct. 2, 2018.

* cited by examiner

US 10,844,210 B2

MODIFIED POLYETHYLENE RESINS AND METHOD FOR MAKING THE SAME

TECHNICAL FIELD

Embodiments of the present disclosure generally relate to methods of manufacturing modified polyethylene resins having increased melt strength and/or low shear viscosity.

BACKGROUND

Polyethylene resins are used in many applications requiring good physical properties, easy processing, and sufficient melt strength and/or shrink tension for formation of films or blow molded articles. Linear Low Density Polyethylene (LLDPE) has very desirable physical properties, but may lack sufficient melt strength and/or shrink tension to be used in certain film applications, such as, large bubble films, collation shrink films, or in blow molding applications, pipes applications, and extrusion coating applications. In many applications, a blend of LLDPE with LDPE is used to increase the LLDPE melt strength during processing and/or shrink tension of resultant films. Alternatively, LLDPE melt strength may be increased by increasing the molecular weight of the LLDPE. Such solutions, however, can present challenges. For example, LLDPE with high molecular weight can cause high extrusion pressure, thereby lowering extrusion output and potentially causing melt fracture. A typical solution may be to add an amount of LDPE, varying from 20 to 60% depending on the application requirements, to improve process stability; however, the addition of LDPE can cause a significant drop in the mechanical properties, such as, tear, puncture, and dart impact resistance.

Accordingly, alternative methods for producing polyethylene resins having increased melt strength and/or low shear viscosity are desired.

SUMMARY

Disclosed in embodiments herein are methods for increasing the melt strength and/or low shear viscosity of a polyethylene resin. The methods comprise: a) providing a first polyethylene resin having a density ranging from 0.900 g/cm$^3$ to 0.970 g/cm$^3$, a melt index ranging from 0.01 g/10 min to 30 g/10 min, and at least 0.20 vinyl groups per 1,000 total carbons; b) providing a masterbatch composition comprising a free radical generator and a second polyethylene resin, wherein the free radical generator has a half-life at 220° C. of less than 200 seconds, and a decomposition energy higher than −250 kJ/mol, and wherein the second polyethylene resin has a density ranging from 0.900 g/cm$^3$ to 0.970 g/cm$^3$, melt index ranging from 0.01 g/10 min to 100 g/10 min; and c) reacting the first polyethylene resin with the masterbatch composition to form a modified polyethylene resin.

Also disclosed herein are compositions formed from the modified polyethylene resins disclosed herein. The modified polyethylene resins are made by a) providing a first polyethylene resin having a density ranging from 0.900 g/cm$^3$ to 0.970 g/cm$^3$, a melt index ranging from 0.01 g/10 min to 30 g/10 min, and at least 0.20 vinyl groups per 1,000 total carbons; b) providing a masterbatch composition comprising a free radical generator and a second polyethylene resin, wherein the free radical generator has a half-life at 220° C. of less than 200 seconds, and a decomposition energy higher than −250 kJ/mol, and wherein the second polyethylene resin has a density ranging from 0.900 g/cm$^3$ to 0.970 g/cm$^3$, melt index ranging from 0.01 g/10 min to 100 g/10 min; and c) reacting the first polyethylene resin with the masterbatch composition to form the modified polyethylene resin.

Further disclosed herein are films formed from the modified polyethylene resins disclosed herein. The modified polyethylene resins are made by a) providing a first polyethylene resin having a density ranging from 0.900 g/cm$^3$ to 0.970 g/cm$^3$, a melt index ranging from 0.01 g/10 min to 30 g/10 min, and at least 0.20 vinyl groups per 1,000 total carbons; b) providing a masterbatch composition comprising a free radical generator and a second polyethylene resin, wherein the free radical generator has a half-life at 220° C. of less than 200 seconds, and a decomposition energy higher than −250 kJ/mol, and wherein the second polyethylene resin has a density ranging from 0.900 g/cm$^3$ to 0.970 g/cm$^3$, melt index ranging from 0.01 g/10 min to 100 g/10 min; and c) reacting the first polyethylene resin with the masterbatch composition to form the modified polyethylene resin.

Additional features and advantages of the embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing and the following description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
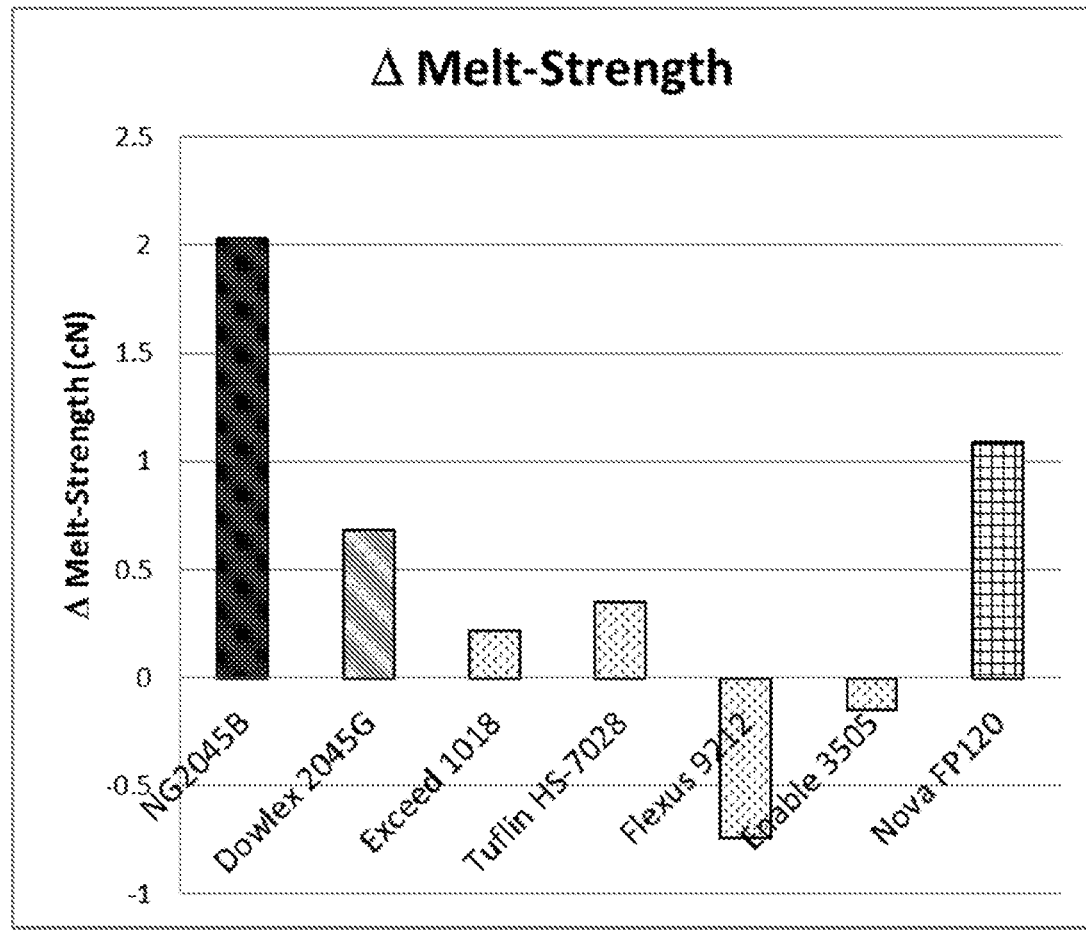
FIG. 1 graphically depicts the difference in melt strength between various free radical generator-modified polyethylene resins according to one or more embodiments shown and described herein and polyethylene resins that are not free radical generator-modified.

Reference will now be made in detail to embodiments of increasing the melt strength and/or low shear viscosity of a polyethylene resin. The polyethylene resins having increased melt strength may be used to form films. The films may be used in agricultural films, thermoformed films, and collation shrink applications. It is noted however, that this is merely an illustrative implementation of the embodiments disclosed herein. The embodiments are applicable to other technologies that are susceptible to similar problems as those discussed above. For example, the polyethylene resins having increased melt strength may be used in blow molding applications, extrusion coating, and pipe applications, all of which are within the purview of the present embodiments.

In embodiments described herein, the method for increasing the melt strength and/or low shear viscosity of a polyethylene resin comprises: a) providing a first polyethylene resin; b) providing a masterbatch composition comprising a free radical generator and a second polyethylene resin; and b) reacting the first polyethylene resin with the masterbatch composition to form a modified polyethylene resin.

First Polyethylene Resin

In embodiments herein, the first polyethylene resin having a density ranging from 0.900 g/cm$^3$ to 0.970 g/cm$^3$, a melt index ranging from 0.01 g/10 min to 30 g/10 min, and at least 0.20 vinyl groups per 1,000 total carbons.

As noted above, the density ranges from 0.900 g/cm$^3$ to 0.970 g/cm$^3$. All individual values and subranges of 0.900 g/cm$^3$ to 0.970 g/cm$^3$ are included and disclosed herein. For example, in some embodiments, the density ranges from a lower limit of 0.900, 0.902, 0.905, 0.907, 0.910, 0.912, 0.915, 0.920, 0.925, 0.930, 0.935, or 0.940 g/cm$^3$ to an upper limit of 0.970, 0.965, 0.960, 0.955, 0.950, 0.945, 0.942, 0.940, 0.937, 0.935, 0.930, 0.927, 0.925, 0.922, or 0.920 g/cm$^3$. In other embodiments, the density ranges from 0.905 g/cm$^3$ to 0.965 g/cm$^3$, 0.905 g/cm$^3$ to 0.960 g/cm$^3$, 0.907 g/cm$^3$ to 0.960 g/cm$^3$, 0.910 g/cm$^3$ to 0.955 g/cm$^3$, 0.910 g/cm$^3$ to 0.950 g/cm$^3$, 0.910 g/cm$^3$ to 0.947 g/cm$^3$, 0.910 g/cm$^3$ to 0.945 g/cm$^3$, 0.910 g/cm$^3$ to 0.9420 g/cm$^3$, or 0.910 g/cm$^3$ to 0.940 g/cm$^3$.

As previously noted, the melt index ranges from 0.01 g/10 min to 30 g/10 min. All individual values and subranges of 0.01 g/10 min to 30 g/10 min are included and disclosed herein. For example, in some embodiments, the melt index ranges from a lower limit of 0.01, 0.05, 0.1, 0.25, 0.5, 1, 3, 5, 7, 10, 12, 15, 18, 20, 23, or 25 to an upper limit of 30, 27, 25, 22, 20, 17, 15, 12, 10, 8, 5, 2, 1, 0.9, 0.7, or 0.5. In other embodiments, the melt index ranges from 0.05 g/10 min to 30 g/10 min, 0.1 g/10 min to 30 g/10 min, 0.1 g/10 min to 25 g/10 min, 0.1 g/10 min to 20 g/10 min, 0.1 g/10 min to 18 g/10 min, 0.1 g/15 min to 30 g/10 min, 0.25 g/10 min to 15 g/10 min, 0.25 g/10 min to 12 g/10 min, 0.25 g/10 min to 10 g/10 min, 0.25 g/10 min to 8 g/10 min, 0.25 g/10 min to 5 g/10 min.

As previously noted, the first polyethylene resin has at least 0.20 vinyl groups per 1,000 total carbons. All individual values and subranges of at least 0.20 vinyl groups per 1,000 total carbons are included and disclosed herein. For example, in some embodiments, the first polyethylene resin has at least 0.20, 0.22, 0.23, 0.24, 0.25, 0.30, 0.32, or 0.35 vinyl groups per 1,000 total carbons. In other embodiments, the first polyethylene resin has from 0.20 vinyl groups per 1,000 total carbons to 1.00 vinyl groups per 1,000 total carbons, 0.22 vinyl groups per 1,000 total carbons to 0.70 vinyl groups per 1,000 total carbons, 0.23 vinyl groups per 1,000 total carbons to 0.70 vinyl groups per 1,000 total carbons, 0.24 vinyl groups per 1,000 total carbons to 0.70 vinyl groups per 1,000 total carbons, 0.25 vinyl groups per 1,000 total carbons to 0.70 vinyl groups per 1,000 total carbons. In further embodiments, the first polyethylene resin has from 0.20 vinyl groups per 1,000 total carbons to 0.65 vinyl groups per 1,000 total carbons, 0.20 vinyl groups per 1,000 total carbons to 0.60 vinyl groups per 1,000 total carbons, 0.20 vinyl groups per 1,000 total carbons to 0.55 vinyl groups per 1,000 total carbons, 0.20 vinyl groups per 1,000 total carbons to 0.50 vinyl groups per 1,000 total carbons, 0.20 vinyl groups per 1,000 total carbons to 0.47 vinyl groups per 1,000 total carbons, or 0.20 vinyl groups per 1,000 total carbons to 0.45 vinyl groups per 1,000 total carbons.

In some embodiments herein, the first polyethylene resin may comprise less than 2,000 ppm of primary antioxidant. All individual values and subranges of less than 2,000 ppm of primary antioxidant are included and disclosed herein. For example, in some embodiments, the first polyethylene resin may comprise from a lower limit of 0, 10, 25, 50, 100, 200, 300, 400, 500, 600, 700, 800, 900, 1000, 1100, 1200, 1300, 1400, 1500, 1600, 1700, 1800, or 1900 ppm to an upper limit of 15, 30, 50, 75, 100, 150, 250, 350, 450, 550, 650, 750, 850, 950, 1000, 1050, 1150, 1250, 1350, 1450, 1500, 1550, 1650, 1750, 1850, 1950, or 2000 ppm of primary antioxidant. In other embodiments herein, the first polyethylene resin may comprise less than 250 ppm, less than 200 ppm, less than 150 ppm, less than 100 ppm, less than 50 ppm, less than 25 ppm, or 0 ppm of primary antioxidant. In further embodiments, the first polyethylene resin may comprise from 10 to 1,000 ppm, from 10 to 500 ppm, from 500 to 1,000 ppm, from 10 to 300 ppm, or from 20 to 100 ppm of primary antioxidant. Primary Antioxidants are radical scavengers that are generally organic molecules consisting of hindered phenols or hindered amine derivatives. Examples of primary antioxidants include primary antioxidants that are well known in the polyolefin industry, such as, pentaerythrityl tetrakis(3-(3,5-di-tert-butyl-4-hydroxyphenol)propionate), which is commercially available from BASF under the name of IRGANOX™ 1010, or octadecyl 3-(3,5-di-tert-butyl-4-hydroxyphenyl)propionate, which is commercially available from BASF under the name IRGANOX™ 1076. Secondary antioxidants decompose hydroperoxides and are generally organic molecules consisting of phosphites, phosphonites, or thio compounds. Exemplary secondary antioxidants include tris(2,4-ditert-butylphenyl) phosphite, which is commercially available from BASF under the name IRGAFOS™ 168, or tris (nonylphenyl) phosphite.

The first polyethylene resin may be any ethylene-based resin having the density, melt index, and vinyl groups per 1,000 total carbons as previously described herein. Such polyethylene resins include polyethylene homopolymers, polyethylene copolymers, and polyethylene interpolymers, in which greater than 50 percent by weight of the polymer is derived from ethylene. As used herein, copolymer means a polymer having units derived from two different monomers and interpolymer means a polymer having units derived from three or more different monomers. The first polyethylene resin may be a homogeneously branched or heterogeneously branched and/or unimodal or multimodal (e.g., bimodal) polyethylene. As used herein, "unimodal" refers to the MWD in a GPC curve does not substantially exhibit multiple component polymers (i.e., no humps, shoulders or tails exist or are substantially discernible in the GPC curve). In other words, the degree of separation is zero or substantially close to zero. As used herein, "multimodal" refers to the MWD in a GPC curve exhibits two or more component polymers, wherein one component polymer may even exist as a hump, shoulder or tail relative to the MWD of the other component polymer.

As noted above, the first polyethylene resin may comprise interpolymers of ethylene and at least one comonomer. Examples of suitable comonomers may include alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the first polyethylene resin is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the first polyethylene resin is an ethylene/alpha-olefin copolymer, wherein the alpha-olefin is selected from the group consisting of propylene, 1-butene, 1-hexene, and 1-octene. In further embodiments, the first polyethylene resin is an ethylene/alpha-olefin copolymer, wherein the alpha-olefin is selected from the group consisting of 1-hexene and 1-octene.

In some embodiments, the first polyethylene resin is an ethylene/alpha-olefin copolymer that comprises greater than 50%, by weight, of the units derived from ethylene. All individual values and subranges of greater than 50%, by weight, are included and disclosed herein. For example, the first polyethylene resin is an ethylene/alpha-olefin copolymer that may comprise at least 60%, at least 70%, at least 80%, at least 90%, at least 92%, at least 95%, at least 97%, at least 98%, at least 99%, at least 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene. The first polyethylene resin is an ethylene/alpha-olefin copolymer that may comprise less than 30%, by weight, of units derived from one or more alpha-olefin comonomers. All individual values and subranges of less than 30%, by weight, are included herein and disclosed herein. For example, the first polyethylene resin is an ethylene/alpha-olefin copolymer that may comprise less than 25%, less than 20%, less than 18%, less than 15%, less than 12%, less than 10%, less than 8%, less than 5%, less than 4%, less than 3%, from 0.2 to 15%, 0.2 to 12%, 0.2 to 10%, 0.2 to 8%, 0.2 to 5%, 0.2 to 3%, 0.2 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

In some embodiments, the first polyethylene resin is an ethylene/alpha-olefin copolymer that may comprise at least 90 percent by moles of units derived from ethylene. All individual values and subranges from at least 90 mole percent are included herein and disclosed herein; for example, the first polyethylene resin is an ethylene/alpha-olefin copolymer that may comprise at least 93 percent, at least 95 percent, at least 96 percent, at least 97 percent, at least 98 percent, at least 99 percent, by moles, of units derived from ethylene; or in the alternative, the first polyethylene resin is an ethylene/alpha-olefin copolymer that may comprise from 85 to 99.5 percent, from 85 to 99 percent, from 85 to 97 percent, from 85 to 95 percent, from 88 to 99.5 percent, from 88 to 99 percent, from 88 to 97 percent, from 88 to 95 percent, from 90 to 99.5 percent, from 90 to 99 percent, from 90 to 97 percent, from 90 to 95 percent, from 92 to 99.5, from 92 to 99 percent, from 92 to 97 percent, from 95 to 99.5, from 95 to 99 percent, from 97 to 99.5 percent, or from 97 to 99 percent, by moles, of units derived from ethylene. The first polyethylene resin is an ethylene/alpha-olefin copolymer that may comprise less than 15 percent by moles of units derived from one or more a-olefin comonomers. All individual values and subranges from less than 15 mole percent are included herein and disclosed herein. For example, the first polyethylene resin is an ethylene/alpha-olefin copolymer that may comprise less than 12 percent, less than 10 percent, less than 8 percent, less than 7 percent, less than 5 percent, less than 4 percent, or less than 3 percent, by moles, of units derived from one or more alpha-olefin comonomers; or in the alternative, the first polyethylene resin is an ethylene/alpha-olefin copolymer that may comprise from 0.5 to 15 percent, from 0.5 to 12 percent, from 0.5 to 10 percent, 0.5 to 8 percent, 0.5 to 5 percent, 0.5 to 3 percent, 1 to 12 percent, 1 to 10 percent, 1 to 8 percent, 1 to 5 percent, 2 to 12 percent, 2 to 10 percent, 2 to 8 percent, 2 to 5 percent, 3 to 12 percent, 3 to 10 percent, 3 to 7 percent, by moles of units derived from one or more alpha-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Other examples of suitable first polyethylene resin include substantially linear ethylene polymers, which are further defined in U.S. Pat. Nos. 5,272,236, 5,278,272, 5,582,923, 5,733,155, and EP2653392, and which are incorporated by reference; homogeneously branched linear ethylene polymer compositions, such as those in U.S. Pat. No. 3,645,992, which is incorporated by reference; heterogeneously branched ethylene polymers, such as those prepared according to the process disclosed in U.S. Pat. No. 4,076,698; and/or blends thereof (such as those disclosed in U.S. Pat. No. 3,914,342 or 5,854,045), all of which is incorporated by reference. In some embodiments, the first polyethylene resin may include DOWLEX™ resins sold by The Dow Chemical Company, including, for example, DOWLEX™ 2045G, NG 2045B, 2049B, 2685, TG 2085B, 2038, or 2050; resins or linear low density polyethylene resins sold by Nova Chemicals Corp., including, for example, SCLAIR™ FP120 and NOVAPOL™ TF-Y534.

The first polyethylene resin can be made via gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. Suitable first polyethylene resins may be produced according to the processes described at pages 15-17 and 20-22 in WO 2005/111291 A1, which is herein incorporated by reference. The catalysts used to make the first polyethylene resins described herein may include Ziegler-Natta, chrome, metallocene, constrained geometry, or single site catalysts. In some embodiments, the first polyethylene resin may be a znLLDPE, which refers to linear polyethylene made using Ziegler-Natta catalysts, a uLLDPE or "ultra linear low density polyethylene," which may include linear polyethylenes made using Ziegler-Natta catalysts, or a mLLDPE, which refers to LLDPE made using metallocene or constrained geometry catalyzed polyethylene. In some embodiments, the first polyethylene resin may be a unimodal LLDPE prepared using a single stage polymerization, e.g. slurry, solution, or gas phase polymerization. In other embodiments, the first polyethylene resin may be a unimodal LLDPE prepared in a loop reactor, for example, in a single stage loop polymerization process. Loop reactor processes are further described in WO/2006/045501 or WO2008104371. Multimodal (e.g. bimodal) polymers can be made by mechanical blending of two or more separately prepared polymer components or prepared in-situ in a multistage polymerization process. Both mechanical blending and preparation in-situ. In some embodiments, the first polyethylene resin may be a multimodal LLDPE prepared in-situ in a multistage, i.e. two or more stage, polymerization or by the use of one or more different polymerization catalysts, including single-, multi- or dual site catalysts, in a one stage polymerization. For example, the first polyethylene resin may be a multimodal LLDPE produced in at least two-stage polymerization using the same catalyst, for e.g. a single site or Ziegler-Natta catalyst, as disclosed in U.S. Pat. No. 8,372,931, which is herein incorporated by reference. Thus, for example two solution reactors, two slurry reactors, two gas phase reactors, or any combinations thereof, in any order can be employed, such as disclosed in U.S. Pat. No. 4,352,915 (two slurry reactors), U.S. Pat. No. 5,925,448 (two fluidized bed reactors), and U.S. Pat. No. 6,445,642 (loop reactor followed by a gas phase reactor). However, in other embodiments, the first polyethylene resin may be a multimodal polymer, e.g. LLDPE, made using a slurry polymerization in a loop reactor followed by a gas phase polymerization in a gas phase reactor, as disclosed in EP 2653392 A1, which is herein incorporated by reference.

Free Radical Generator (FRG)

As noted above, the masterbatch comprises a free radical generator and a second polyethylene resin. In embodiments herein, the free radical generator has a half-life at 220° C. of less than 200 seconds and a decomposition energy higher than (i.e., more negative than) −250 kJ/mol. In some embodiments, the free radical generator has a half-life at 220° C. of less than 175 seconds, 150 seconds, or 125 seconds. In other embodiments, the free radical generator has a half-life at 220° C. of from 60 to 200 seconds, 60 to 175 seconds, 60 to 150 second, 60 to 125 seconds, or 60 to 120 seconds.

In embodiments herein, the free radical generator may have a molecular weight from 200 to 1,000 Daltons. All individual values and subranges of from 200 to 1,000 Daltons are included and disclosed herein. For example, in some embodiments, the free radical generator may have a molecular weight from 225 to 1000, 250 to 1000, or 250 to 700.

In embodiments herein, the free radical generator is present in an amount ranging from 5 ppm to 1000 ppm relative to the total amount of resin. All individual values and subranges from 5 to 1,000 ppm are included herein and disclosed herein; for example, the amount of free radical generator relative to the total amount of resin may range from a lower limit of 5, 10, 20, 30, 50, 80, 100, 200, 300, 400, 500, 600, 700, 800 or 900 ppm to an upper limit of 15, 25, 30, 35, 50, 60, 65, 75, 100, 150, 250, 350, 450, 550, 650, 750, 850, 950 or 1000 ppm. In some embodiments, the amount of free radical generator reacted with the first polyethylene resin may be in the range of from 5 to 100 ppm relative to the total amount of resin, or in the alternative, the amount of free radical generator reacted with the first polyethylene resin may be in the range of from 5 to 80 ppm relative to the total amount of resin, or in the alternative, the amount of free radical generator reacted with the first polyethylene resin may be in the range of from 5 to 75 ppm relative to the total amount of resin, or in the alternative, the amount of free radical generator reacted with the first polyethylene resin may be in the range of from 10 to 75 ppm relative to the total amount of resin, or in the alternative, the amount of free radical generator reacted with the first polyethylene resin may be in the range of from 5 to 50 ppm relative to the total amount of resin. In other embodiments, the amount of free radical generator reacted with the first polyethylene resin is less than 30 ppm relative to the total amount of resin used. In further embodiments, the amount of free radical generator reacted with the first polyethylene resin may range from 5 ppm to 30 ppm, 10 ppm to 30 ppm, 15 to 25 ppm, 20 to 30 ppm, or 10 to 25 ppm.

In embodiments herein, the free radical generator may be a cyclic peroxide. An example of a suitable cyclic peroxide may be represented by the formula:

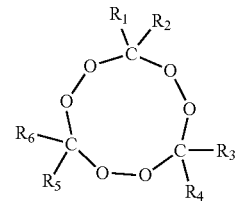

wherein R1-R6 are independently hydrogen or an inertly-substituted or unsubstituted C1-C20 alkyl, C3-C20 cycloalkyl, C6-C20 aryl, C7-C20 aralkyl, or C7-C20 alkaryl. Representative of the inert-substituents included in R1-R6 are hydroxyl, C1-C20 alkoxy, linear or branched C1-C20 alkyl, C6-C20 aryloxy, halogen, ester, carboxyl, nitrile, and amido. In some embodiments, R1-R6 are each independently lower alkyls, including, for example, C1-C10 alkyl, or C1-C4 alkyl.

Some of the cyclic peroxides as described herein are commercially available, but otherwise can be made by contacting a ketone with hydrogen peroxide as described in U.S. Pat. No. 3,003,000; Uhlmann, 3rd Ed., Vol. 13, pp. 256-57 (1962); the article, "Studies in Organic Peroxides XXV Preparation, Separation and Identification of Peroxides Derived from Methyl Ethyl Ketone and Hydrogen Peroxide," Milas, N. A. and Golubovic, A., J. Am. Chem. Soc, Vol. 81, pp. 5824-26 (1959); "Organic Peroxides", Swern, D. editor, Wiley-Interscience, New York (1970); and Houben-Weyl Methoden der Organische Chemie, El 3, Volume 1, page 736.

Examples of the other cyclic peroxides include those derived from acetone, methylamyl ketone, methylheptyl ketone, methylhexyl ketone, methylpropyl ketone, methylbutyl ketone, diethyl ketone, methylethyl ketone methyloctyl ketone, methylnonyl ketone, methyldecyl ketone and methylundecyl ketone. The cyclic peroxides can be used alone or in combination with one another.

In some embodiments, the cyclic peroxide may be 3,6,9-triethyl-3-6-9-trimethyl-1,4,7-triperoxonane, which is commercially available from AkzoNobel under the trade designation TRIGONOX 301. The cyclic peroxide used herein can be liquid, solid, or paste depending on the melting point of the peroxide and the diluent, if any, within which it is carried.

Second Polyethylene Resin

The second polyethylene resin has a density ranging from 0.900 g/cm$^3$ to 0.970 g/cm$^3$ and a melt index ranging from 0.01 g/10 min to 100 g/10 min. All individual values and subranges of a density ranging from 0.900 g/cm$^3$ to 0.970 g/cm$^3$ and a melt index ranging from 0.01 g/10 min to 100 g/10 min are included and disclosed herein.

For example, in some embodiments, the density ranges from a lower limit of 0.900, 0.902, 0.905, 0.907, 0.910, 0.912, 0.915, 0.920, 0.925, 0.930, 0.935, or 0.940 g/cm$^3$ to an upper limit of 0.970, 0.965, 0.960, 0.955, 0.950, 0.945, 0.942, 0.940, 0.937, 0.935, 0.930, 0.927, 0.925, 0.922, or 0.920 g/cm$^3$. In other embodiments, the density ranges from 0.905 g/cm$^3$ to 0.965 g/cm$^3$, 0.905 g/cm$^3$ to 0.960 g/cm$^3$, 0.907 g/cm$^3$ to 0.960 g/cm$^3$, 0.910 g/cm$^3$ to 0.955 g/cm$^3$, 0.910 g/cm$^3$ to 0.950 g/cm$^3$, 0.910 g/cm$^3$ to 0.947 g/cm$^3$, 0.910 g/cm$^3$ to 0.945 g/cm$^3$, 0.910 g/cm$^3$ to 0.9420 g/cm$^3$, or 0.910 g/cm$^3$ to 0.940 g/cm$^3$.

For example, in some embodiments, the melt index ranges from a lower limit of 0.01, 0.05, 0.1, 0.5, 1, 3, 5, 7, 10, 12, 15, 18, 20, 23, 25, 30, 35, 40, 45, 50, 55, 60, 65, 70, 75, 80, 85, or 90 to an upper limit of 100, 95, 90, 85, 80, 75, 70, 65, 60, 55, 50, 45, 40, 35, 30, 27, 25, 22, 20, 17, 15, 12, 10, 8, 5, 2, 1, 0.9, 0.7, or 0.5. In other embodiments, the melt index ranges from 0.05 g/10 min to 30 g/10 min, 0.1 g/10 min to 30 g/10 min, 0.1 g/10 min to 25 g/10 min, 0.1 g/10 min to 20 g/10 min, 0.1 g/10 min to 18 g/10 min, 0.1 g/15 min to 30 g/10 min, 0.25 g/10 min to 15 g/10 min, 0.25 g/10 min to 12 g/10 min, 0.25 g/10 min to 10 g/10 min, 0.25 g/10 min to 8 g/10 min, 0.25 g/10 min to 5 g/10 min.

In some embodiments herein, the second polyethylene resin may comprise less than 250 ppm of primary antioxidant. All individual values and subranges of less than 250 ppm of primary antioxidant are included and disclosed herein. For example, in some embodiments, the second polyethylene resin may comprise less than 150 ppm, less than 100 ppm, less than 50 ppm, less than 25 ppm, or 0 ppm of primary antioxidant. In other embodiments herein, the first polyethylene resin may comprise less than 250 ppm, less than 150 ppm, less than 100 ppm, less than 50 ppm, less than 25 ppm, or 0 ppm of primary antioxidant and the second polyethylene resin may comprise less than 250 ppm, less than 150 ppm, less than 100 ppm, less than 50 ppm, less than 25 ppm, or 0 ppm of primary antioxidant. Of course, other individual values and subranges of less than 250 ppm of primary antioxidant present in the first and/or second polyethylene resin are included and disclosed herein.

In some embodiments herein, the masterbatch composition may comprise less than 1,000 ppm of primary antioxidant. All individual values and subranges of less than 1,000 ppm of primary antioxidant are included and disclosed herein. For example, in some embodiments, the masterbatch composition may comprise from a lower limit of 0, 10, 25, 50, 100, 200, 300, 400, 500, 600, 700, 800, or 900 ppm to an upper limit of 15, 30, 50, 75, 100, 150, 250, 350, 450, 550, 650, 750, 850, 950, or 1,000 ppm of primary antioxidant. In other embodiments herein, the masterbatch composition may comprise from 10 to 1,000 ppm, from 10 to 500 ppm, from 500 to 1,000 ppm, from 10 to 300 ppm, or from 20 to 100 ppm of primary antioxidant.

The second polyethylene resin may be a low density polyethylene (LDPE), a linear low density polyethylene (LLDPE), a medium density polyethylene (MDPE), a high density polyethylene (HDPE), or combinations thereof. In some embodiments, the second polyethylene resin is a LDPE. In other embodiments, the second polyethylene is a LLDPE. In further embodiments, the second polyethylene is a MDPE or a HDPE.

In embodiments herein where the second polyethylene resin is an LDPE, the LDPE may include branched polymers that are partly or entirely homopolymerized or copolymerized in autoclave and/or tubular reactors, or any combination thereof, using any type of reactor or reactor configuration known in the art, at pressures above 14,500 psi (100 MPa) with the use of free-radical initiators, such as peroxides (see for example U.S. Pat. No. 4,599,392, herein incorporated by reference). In some embodiments, the LDPE may be made in an autoclave process under single phase conditions designed to impart high levels of long chain branching, such as described in PCT patent publication WO 2005/023912, the disclosure of which is incorporated herein. Examples of suitable LDPEs may include, but are not limited to, ethylene homopolymers, and high pressure copolymers, including ethylene interpolymerized with, for example, vinyl acetate, ethyl acrylate, butyl acrylate, acrylic acid, methacrylic acid, carbon monoxide, or combinations thereof. The ethylene may also be interpolymerized with an alpha-olefin comonomer, for example, at least one C3-C20 alpha-olefin, such as propylene, isobutylene, 1-butene, 1-pentene, 1-hexene, and mixtures thereof. Exemplary LDPE resins may include, but is not limited to, resins sold by The Dow Chemical Company, such as, LDPE 4016 resins, LDPE 132I resins, LDPE 621I resins, LDPE 662I resins, or AGILITY™ 1000 and 2001 resins, resins sold by Westlake Chemical Corporation (Houston, Tex.), such as EF412, EF602, EF403, or EF601, resins sold by LyondellBasell Industries (Houston, Tex.), such as, PETROTHENE™ M2520 or NA940, and resins sold by The ExxonMobil Chemical Company (Houston, Tex.) such as, LDPE LD 051.LQ or NEXXSTAR™ LDPE-00328. Other exemplary LDPE resins are described in WO 2014/051682 and WO 2011/019563, which are herein incorporated by reference.

In embodiments herein where the second polyethylene resin is a LLDPE, the LLDPE may be a homogeneously branched or heterogeneously branched and/or unimodal or multimodal (e.g., bimodal) polyethylene. The linear low density polyethylene comprises ethylene homopolymers, interpolymers of ethylene and at least one comonomer, and blends thereof. Examples of suitable comonomers may include alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the linear low density polyethylene is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the linear low density polyethylene is an ethylene/alpha-olefin copolymer, wherein the alpha-olefin is selected from the group consisting of propylene, 1-butene, 1-hexene, and 1-octene. In further embodiments, the linear low density polyethylene is an ethylene/alpha-olefin copolymer, wherein the alpha-olefin is selected from the group consisting of 1-hexene and 1-octene.

The linear low density polyethylene can be made via gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. Suitable linear low density polyethylene may be produced according to the processes described at pages 15-17 and 20-22 in WO 2005/111291 A1, which is herein incorporated by reference. The catalysts used to make the linear low density polyethylene described herein may include Ziegler-Natta, chrome, metallocene, constrained geometry, or single site catalysts. Examples of suitable linear low density polyethylene include substantially linear ethylene polymers, which are further defined in U.S. Pat. Nos. 5,272,236, 5,278,272, 5,582,923, 5,733,155, and EP2653392, and which are incorporated by reference; homogeneously branched linear ethylene polymer compositions, such as those in U.S. Pat. No. 3,645,992, which is incorporated by reference; heterogeneously branched ethylene polymers, such as those prepared according to the process disclosed in U.S. Pat. No. 4,076,698; and/or blends thereof (such as those disclosed in U.S. Pat. No. 3,914,342 or 5,854,045), all of which is incorporated by reference. In some embodiments, the linear low density polyethylene may include ELITE™, ELITE™ AT, ATTANE™, AFFINITY™, FLEXOMER™, or DOWLEX™ resins sold by The Dow Chemical Company, including, for example, ELITE™ 5100G or 5400G resins, ELITE™ AT 6401, ATTANE™ 4201 or 4202 resins, AFFINITY™ 1840, and DOWLEX™ 2020, 2045G, 2049G, or 2685 resins; EXCEED™ or ENABLE™ resins sold by Exxon Mobil Corporation, including, for example, EXCEED™ 1012, 1018 or 1023JA resins, and ENABLE™ 27-03, 27-05, or 35-05 resins; linear low density polyethylene resins sold by Westlake Chemical Corporation, including, for example, LLDPE LF1020 or HIFOR Xtreme™ SC74836 resins; linear low density polyethylene resins sold by LyondellBasell Industries, including, for example, PETROTHENE™ GA501 and LP540200 resins, and ALATHON™ L5005 resin; linear low density polyethylene resins sold by Nova Chemicals Corp., including, for example, SCLAIR™ FP120 and NOVAPOL™ TF-Y534; linear low density polyethylene resins sold by Chevron Phillips Chemical Company, LLC, including, for example, mPACT™ D139 or D350 resins and MARFLEX™ HHM TR-130 resin; linear low density polyethylene resins sold by Borealis AG, including, for example, BORSTAR™ FB 2310 resin.

In embodiments herein where the second polyethylene resin is a MDPE, the MDPE may be an ethylene homopolymer or copolymers of ethylene and alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the MDPE is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the MDPE is an ethylene/alpha-olefin copolymer, wherein the alpha-olefin is selected from the group consisting of propylene, 1-butene, 1-hexene, and 1-octene. The MDPE may have a density of from 0.923 g/cm$^3$ and 0.935 g/cm$^3$. All individual values and subranges are included and disclosed herein.

The MDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the MDPE is made in the solution process operating in either parallel or series dual reactor mode. The MDPE may also be made by a high pressure, free-radical polymerization process. Methods for preparing MDPE by high pressure, free radical polymerization can be found in U.S. 2004/0054097, which is herein incorporated by reference, and can be carried out in an autoclave or tubular reactor as well as any combination thereof. The catalysts used to make the MDPE described herein may include Ziegler-Natta, metallocene, constrained geometry, single site catalysts, or chromium-based catalysts. Exemplary suitable MDPE resins may include resins sold by The Dow Chemical Company, such as, DOWLEX™ 2038.68G or DOWLEX™ 2042G, resins sold by LyondellBasell Industries (Houston, Tex.), such as, PETROTHENE™ L3035, ENABLE™ resins sold by The ExxonMobil Chemical Company (Houston, Tex.), resins sold by Chevron Phillips Chemical Company LP, such as, MARFLEX™ TR-130, and resins sold by Total Petrochemicals & Refining USA Inc., such as HF 513, HT 514, and HR 515. Other exemplary MDPE resins are described in U.S. 2014/0255674, which is herein incorporated by reference.

In embodiments herein where the second polyethylene resin is a HDPE, the HDPE may also be an ethylene homopolymer or copolymers of ethylene and alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the HDPE is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the HDPE is an ethylene/alpha-olefin copolymer, wherein the alpha-olefin is selected from the group consisting of propylene, 1-butene, 1-hexene, and 1-octene. The amount of comonomer used will depend upon the desired density of the HDPE polymer and the specific comonomers selected, taking into account processing conditions, such as temperature and pressure, and other factors such as the presence or absence of telomers and the like, as would be apparent to one of ordinary skill in the art in possession of the present disclosure. The HDPE may have a density of from 0.935 g/cm$^3$ and 0.975 g/cm$^3$. All individual values and subranges are included and disclosed herein.

The HDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the HDPE is made in the solution process operating in either parallel or series dual reactor mode. The catalysts used to make the HDPE described herein may include Ziegler-Natta, metallocene, constrained geometry, single site catalysts, or chromium-based catalysts. The HDPE can be unimodal, bimodal, and multimodal. Exemplary HDPE resins that are commercially available include, for instance, ELITE™ 5940G, ELITE™ 5960G, HDPE 35454L, HDPE 82054, HDPE DGDA-2484 NT, DGDA-2485 NT, DGDA-5004 NT, DGDB-2480 NT resins available from The Dow Chemical Company (Midland, Mich.), L5885 and M6020 HDPE resins from Equistar Chemicals, LP, ALATHON™ L5005 from LyondellBasell Industries (Houston, Tex.), and MARFLEX™ HDPE HHM TR-130 from Chevron Phillips Chemical Company LP. Other exemplary HDPE resins are described in U.S. Pat. No. 7,812,094, which is herein incorporated by reference.

As noted above, disclosed herein is a method for increasing the melt strength and/or low shear viscosity of a polyethylene resin. Without being bound by theory, it is believed that the introduction of the inventive free radical generators described herein produces long chain branches or similar structure into the polymer, thereby increasing melt strength and/or low shear viscosity. The method comprises: a) providing a first polyethylene resin having a density ranging from 0.900 g/cm$^3$ to 0.970 g/cm$^3$, a melt index ranging from 0.01 g/10 min to 30 g/10 min, and at least 0.20 vinyl groups per 1,000 total carbons; b) providing a masterbatch composition comprising a free radical generator and a second polyethylene resin, wherein the free radical generator has a half-life at 220° C. of less than 200 seconds, and a decomposition energy higher than −250 kJ/mol, and wherein the second polyethylene resin has a density ranging from 0.900 g/cm$^3$ to 0.970 g/cm$^3$, melt index ranging from 0.01 g/10 min to 100 g/10 min; and c) reacting the first polyethylene resin with the masterbatch composition to form a modified polyethylene resin. In some embodiments, a composition may be formed from the modified polyethylene resin described herein. In other embodiments, a film maybe formed from the modified polyethylene resin described herein. The film may be a blown film or a cast film. The film may also be a multilayer film or a monolayer film.

The reacting of the first polyethylene resin with the masterbatch composition can be carried out in any customary mixing equipment in which the polymer is melted and mixed with the masterbatch. Suitable equipment is known to those skilled in the art, including for example, mixers, kneaders, and extruders. In some embodiments, the reacting of the first polyethylene resin with the free radical generator takes place in an extruder. The extruder may further be attached to a blown-film or cast film line. In some embodiments, the reacting of the first polyethylene resin with the free radical generator takes place in an extruder attached to a blown-film or cast film line.

Exemplary extruder or kneader equipment includes, for example, single-screw extruders, contra-rotating and co-rotating twin-screw extruders, planetary-gear extruders, ring extruders, or co-kneaders. Suitable extruders and kneaders are further described, for example, in Handbuch der Kunststoftextrusion, Vol 1 Grundlagen, Editors F. Hensen, W. Knappe, H. Potente, 1989, pp. 3-7, ISBN.3-446-14339-4 (Vol 2 Extrusionsanlagen 1986, ISBN 3-446-14329-7). In embodiments herein, the screw length can range from 1-60 times the screw diameter, or 35-48 times the screw diameters. The rotational speed of the screw may range from 10-600 rotations per minute (rpm), or 25-300 rpm. The maximum throughput is dependent on the screw diameter, the rotational speed, and the driving force. The process of the present invention can also be carried out at a level lower than maximum throughput by varying the parameters mentioned or employing weighing machines delivering dosage amounts.

The first polyethylene resin and the masterbatch may be reacted at a ratio of 60:40 to 99.9:0.1. All individual values and subranges are included and disclosed herein. For example, in some embodiments, the first polyethylene resin and the masterbatch may be reacted at a ratio of 65:35 to 99.9:0.1, 65:35 to 99.9:0.1, 70:30 to 99.9:0.1, 75:25 to 99.9:0.1, 80:20 to 99.9:0.1, 85:15 to 99.9:0.1, 90:10 to 99.9:0.1, 95:5 to 99.9:0.1, 97:3 to 99.9:0.1, 95:5 to 99:1, or 97:3 to 99:1. The first polyethylene resin and masterbatch may also be reacted such that the amount of masterbatch in the first polyethylene resin ranges from 0.1 to 40 wt. %. All individual values and subranges are included and disclosed herein. For example, in some embodiments, the first polyethylene resin and the masterbatch may be reacted such that the amount of masterbatch in the first polyethylene resin ranges from 0.1 to 35 wt. %, 0.1 to 30 wt. %, 0.1 to 25 wt. %, 0.1 to 20 wt. %, 0.1 to 15 wt. %, 0.1 to 10 wt. %, 0.1 to 5 wt. %, 0.1 to 3 wt. %, 1 to 5 wt. %, or 1 to 3 wt. %.

The first polyethylene resin and masterbatch are subjected to a temperature above the softening point of the polymers for a sufficient period of time such that the reaction between the first polyethylene resin and the free radical generator can take place. In some embodiments, the first polyethylene resin and masterbatch are subjected to a temperature of less than or equal to 280° C. All individual values and subranges from less than or equal to 280° C. are included herein and disclosed herein. For example, the temperature can be less than or equal to 280, 260, 250, 240, 220, 200, 180 or 160° C. In some embodiments, the temperature is from 120° C. to 280° C., 140° C. to 280° C., 160° C. to 280° C., 180° C. to 280° C., or 180° C. to 260° C. In an alternative embodiment, the temperature is from 200° C. to 260° C. It will be understood that the period of time necessary for reaction can vary as a function of the temperature, the amount of material to be reacted, and the type of equipment used. Under exemplary conditions, the time at which the temperature above the softening point of the polymers is maintained may be from 10 seconds to 30 minutes. All individual values and subranges are included herein and disclosed herein; for example, the time can be from a lower limit of 10 seconds, 20 seconds, 30 seconds, 1 minute, 5 minutes, 15, minutes or 25 minutes to an upper limit of 45 seconds, 3 minutes, 8 minutes, 10 minutes, 12 minutes, 15 minutes, 18 minutes, 20 minutes, 23 minutes, or 30 minutes. For example, the time can be in the range of from 10 seconds to 20 minutes, or in the alternative, the time can be in the range of from 10 seconds to 15 minutes, or in the alternative, the time can be in the range of from 10 seconds to 10 minutes, or in the alternative, the time can be in the range of from 20 seconds to 20 minutes, or in the alternative, the time can be in the range of from 15 minutes to 30 minutes.

Test Methods
Density
Density is measured according to ASTM D792, Method B.
Melt Index
Melt index, or $I_2$, is measured according to ASTM D1238 at 190° C., 2.16 kg.
Melt Strength
Melt strength is measured at 190° C. using a Goettfert Rheotens 71.97 (Goettfert Inc.; Rock Hill, S.C.), melt fed with a Goettfert Rheotester 2000 capillary rheometer equipped with a flat entrance angle (180 degrees) of length of 30 mm and diameter of 2 mm. The pellets are fed into the barrel (L=300 mm, Diameter=12 mm), compressed and allowed to melt for 10 minutes before being extruded at a constant piston speed of 0.265 mm/s, which corresponds to a wall shear rate of 38.2 $s^{-1}$ at the given die diameter. The extrudate passes through the wheels of the Rheotens located at 100 mm below the die exit and is pulled by the wheels downward at an acceleration rate of 2.4 $mm/s^2$. The force (in cN) exerted on the wheels is recorded as a function of the velocity of the wheels (mm/s). Melt strength is reported as the plateau force (cN) before the strand breaks.
Dynamic Mechanical Spectroscopy (DMS)
Resins are compression-molded into "3 mm thick×25 mm" circular plaques at 350° F. (° C. for consistency), for five minutes, under 25,000 lbs, in air. The sample is then taken out of the press, and placed on a counter to cool.
A constant temperature frequency sweep is performed using a TA Instruments "Advanced Rheometric Expansion System (ARES)," equipped with 25 mm (diameter) parallel plates, under a nitrogen purge. The sample is placed on the plate, and allowed to melt for five minutes at 190° C. The plates are then closed to a gap of "2 mm," the sample trimmed (extra sample that extends beyond the circumference of the "25 mm diameter" plate is removed), and then the test is started. The method has an additional five minute delay built in, to allow for temperature equilibrium. The experiments are performed at 190° C. over a frequency range of 0.1 to 100 rad/s. The strain amplitude is constant at 10%.
Vinyl Unsaturation
Sample Preparation
The samples were prepared by adding ~130 mg of sample to 3.25 g of 50/50 by weight Tetrachlorethane-d2/Perchloroethylene with 0.001 M Cr(AcAc)3 in a Norell 1001-7 10 mm NMR tube. The samples were purged by bubbling nitrogen through the solvent via a pipette inserted into the tube for approximately 5 minutes, capped, sealed with Teflon tape and then soaked at room temperature overnight to facilitate sample dissolution. The samples were heated and vortexed at 115° C. to ensure homogeneity.
Data Acquisition Parameters
$^1$H NMR was performed on a Bruker AVANCE 400 MHz spectrometer equipped with a Bruker Dual DUL high-temperature CryoProbe and a sample temperature of 120° C. Two experiments were run to obtain spectra, a control spectrum to quantitate the total polymer protons, and a double presaturation experiment, which suppresses the intense polymer backbone peaks and enables high sensitivity spectra for quantitation of the end-groups. The control was run with ZG pulse, 4 scans, AQ 1.64 s, D1 (relaxation delay) 14 s. The double presaturation experiment was run with a modified pulse sequence, 100 scans, DS 4, AQ 1.64 s, D1 (presaturation time) 1 s, D13 (relaxation delay) 13 s. The region between 4.95 to 5.15 ppm was integrated to determine vinyl content.

Antioxidant Concentration
Antioxidants IRGANOX™ 1010, IRGANOX™ 1076, IRGAFOS™ 168, and tris(nonylphenyl) phosphite ("TNPP") were measured by reversed phase liquid chromatography (Agilent 1260 equipped with a Zorbax Eclipse XDB-C8, 5-µm particle, 4.6×12.5 mm guard column coupled to a Zorbax, Eclipse XDB-C8, 3.5 µm particle, 4.6×50 mm column, and UV absorbance detection at a wavelength of 210 nm). Each polymer resin sample (1 g) was dissolved in 25 mL hot o-xylene followed by reprecipitation of the polymer either into 50 mL methanol (IRGANOX™ 1010, IRGANOX™ 1076, IRGAFOS™ 168), or 50 mL isopropanol (TNPP). After the polymer resin sample was allowed to settle, an aliquot of the supernatant was filtered (0.2 µm PTFE syringe filter) into a 2 mL glass autosampler vial and the vial was capped with a Teflon lined crimp cap. The vials were placed in the LC autosampler for analysis in duplicate and the average concentration was reported. Quantitation was performed using an external standardization procedure based on peak areas.
Half-Life
The thermal decomposition of different free radical generators (FRGs), as a 10% w/w solution in $C_{20}H_{42}$ (eicosane), was investigated with a SensysEvo DSC instrument (Setaram, France) both under isothermal conditions and the temperature scanning mode. In order to obtain the rate law (kinetic parameters) of the thermal decomposition of the FRGs, the 10% w/w solutions of the FRG in $C_{20}H_{42}$ (eicosane) were measured under temperature scanning mode in the temperature interval from 75° C. to 350° C. at five different scanning rates, namely 1° C./min, 2.5° C./min, 5° C./min, 10° C./min, and 20° C./min, respectively. About 60 mg of sample (the 10% w/w of the FRG in eicosane) was loaded into 170 mL Al pans and placed into the DSC instrument at 75° C. (above the melting point of paraffin) under a nitrogen atmosphere (20 cc/min). After thermal equilibration, the temperature was scanned according to the above-mentioned temperature program and the thermograms were recorded. Exothermic peaks were recorded in the temperature intervals from 120° C. to 320° C. The amount of heat released, $-\Delta Hr$ (J/g), is determined from the DSC curves for each specimen, which allows for calculation of the reaction progress/conversion with temperature. The kinetic parameters describing the decomposition rate law were determined both by isoconversional methods (using the AKTS Thermokinetic Software, AKTS AG, Switzerland) and the best fitting parameters according to the Sestak-Berggren autocatalytic model. The activation energy, $E_a$ (kJ/mol), and the apparent pre-exponential factor, ln $A(\alpha) \cdot f(\alpha)(s^{-1}(-))$ as a function of decomposition progress, $\alpha$, are determined using the Friedman differential isoconversional method and the Ozawa integral isoconversional method. The general form of Sestak-Berggren equation is given below:

$$\frac{d\alpha}{dt} = A \cdot \exp^{-E_a} / RT^{\alpha^m (1-\alpha)^n}$$

and the activation energy, $E_a$, the pre-exponential factor, A, and the reaction orders, m and n, in the above equation are determined by the best fitting method. The $E_a$, A, m, and n parameters can then be used to calculate the FRG half-life at any temperature using the AKTS Thermokinetic Software.
Decomposition Energy & Peak Decomposition Temperature
Differential Scanning calorimetry (DSC) was used to measure the decomposition energies and peak decomposition temperatures. The TA Instruments Q2000 DSC, equipped with an RCS (refrigerated cooling system) was used to perform this analysis. A 0.5-2 mg sample was placed in a glass capillary tube, weighed, and flame sealed under nitrogen while being kept cool using a "cold finger" device. Analysis was then performed to determine its thermal properties.

The thermal behavior of the sample was determined by ramping the sample temperature up to create a heat flow versus temperature profile. First, the sample was heated from 0° C. to 400° C., at a rate of 10° C./min. Next, the sample was cooled. The sample was then heated again (this is the "reheat" ramp) at a 10° C./minute heating rate. Both heating curves were recorded. The initial heat curve was analyzed by setting baseline points from the beginning to the end of thermal activity. The reheat was used to assist in the determination of integration start and end.

For the free radical generators, the peak temperature was recorded as well as the total decomposition energy by integration of the area between the curve of the first heat cycle and the baseline. If the decomposition is exothermic, then the area between the curve and the baseline is integrated as negative due to the fact that there is negative heat flow. That is, the sample generates heat. If the sample is endothermic such that it takes heat, then the area is integrated as a positive number.

The heat under the exotherm peak was divided by the purity to extrapolate to 100% pure radical generator.

EXAMPLES

The following materials were used in the examples.

TABLE 1

| First Polyethylene Resins | | |
| --- | --- | --- |
| | Density (g/cm³) | Melt Index (g/10 min) |
| ENABLE ™ 35-05, available from ExxonMobil Chemical Company (Houston, TX) | 0.935 | 0.50 |
| EXCEED ™ 1018, available from ExxonMobil Chemical Company (Houston, TX) | 0.918 | 1.0 |
| SCLAIR ™ FP120, available from Nova Chemicals Corporation (Calgary, Canada) | 0.920 | 1.0 |
| FLEXUS ™ 9212XP, available from Braskem S.A., (São Paulo, Brazil) | 0.917 | 1.0 |
| TUFLIN ™ HS-7028, available from The Dow Chemical Company (Midland, MI) | 0.918 | 1.0 |
| DOWLEX ™ 2045G, available from The Dow Chemical Company (Midland, MI) | 0.920 | 1.0 |
| DOWLEX ™ NG2045B, available from The Dow Chemical Company (Midland, MI) | 0.920 | 1.0 |

TABLE 1-continued

| | Antioxidant | | | | Unsaturation Vinyls |
| --- | --- | --- | --- | --- | --- |
| | I-1010* (ppm) | I-1076* (ppm) | I-168+ (ppm) | TNPP+ (ppm) | #/total 1000 Carbons |
| ENABLE ™ 35-05, available from ExxonMobil Chemical Company (Houston, TX) | — | 267 | — | 436 | 0.013 |
| EXCEED ™ 1018, available from ExxonMobil Chemical Company (Houston, TX) | — | 285 | — | 1356 | 0.070 |
| SCLAIR ™ FP120, available from Nova Chemicals Corporation (Calgary, Canada) | — | 777 | 498 | — | 0.404 |
| FLEXUS ™ 9212XP, available from Braskem S.A., (São Paulo, Brazil) | — | 758 | 486 | — | 0.090 |
| TUFLIN ™ HS-7028, available from The Dow Chemical Company (Midland, MI) | — | 217 | — | 737 | 0.098 |
| DOWLEX ™ 2045G, available from The Dow Chemical Company (Midland, MI) | 152 | 231 | 917 | — | 0.301 |
| DOWLEX ™ NG2045B, available from The Dow Chemical Company (Midland, MI) | — | — | ~1000 | — | 0.261 |

*IRGANOX ™ 1010 (I-1010) and IRGANOX ™ 1076 (I-1076) are primary antioxidants.
+IRGAFOS ™ 168 (I-168) and tris(nonylphenyl) phosphite (TNPP) are secondary antioxidants.

TABLE 2

| | Free Radical Generator | Half-Life at 220° C. (seconds) | Decomposition Energy (kJ/mol) | Molecular Weight (Daltons) | Peak Decomposition Temperature |
|---|---|---|---|---|---|
| FRG-1 | 3,6,9-triethyl-3-6-9-trimethyl-1,4,7-triperoxonane (41% solution in isoparaffins), a cyclic peroxide, available from AkzoNobel N.V. (Netherlands) as TRIGONOX ™ 301 | 82 | −835 | 264.3 | 208° C. |
| FRG-A | 3,3,5,7,7-pentamethyl-1,2,4 trioxepane, a cyclic peroxide, available from AkzoNobel N.V. (Netherlands) as TRIGONOX ™ 311 | 480 | −232 | 174.2 | 239° C. |
| FRG-B | 9-(acetyloxy)-3,8,10-triethyl-7,8,10-trimethyl-1,5-dioxa-9-azaspiro[5.5]undec-3-yl]methyl octadecanoate, an alkoxyamine derivative, available from BASF SE, (Germany) as CGX CR 946 | 221 | −128 | 637.8 | 221° C. |

TABLE 3

Second Polyethylene Resin

| | Density (g/cm³) | Melt Index (g/10 min) | Antioxidant I-1010* (ppm) | I-1076* (ppm) | I-168⁺ (ppm) | TNPP⁺ (ppm) |
|---|---|---|---|---|---|---|
| LDPE 4016, available from The Dow Chemical Company (Midland, MI) | 0.920 | 16 | — | — | — | — |

TABLE 4

Masterbatch Compositions

| | Type of FRG | Added amount of FRG/total amount of LDPE 4016 |
|---|---|---|
| MB-1 | FRG-1 | 1,000 ppm |
| MB-2 | FRG-1 | 500 ppm |
| MB-3 | FRG-1 | 1000 ppm |
| MB-4 | FRG-1 | 1500 ppm |
| MB-5 | FRG-1 | 2500 ppm |
| MB-6 | FRG-1 | 4000 ppm |
| MB-7 | FRG-B | 1000 ppm |
| MB-8 | FRG-B | 2500 ppm |
| MB-9 | FRG-B | 4000 ppm |
| MB-10 | FRG-A | 1000 ppm |

TABLE 5

Comparison of Vinyl Unsaturation Levels - Formulations

| | Base Resin | Masterbatch |
|---|---|---|
| Inventive 1 | 98 wt. % DOWLEX ™ NG2045B | 2 wt. % MB-1 |
| Inventive 2 | 98 wt. % DOWLEX ™ 2045G | 2 wt. % MB-1 |
| Inventive 3 | 98 wt. % SCLAIR ™ FP120 | 2 wt. % MB-1 |
| Comparative 1 | 98 wt. % DOWLEX ™ NG2045B | 2 wt. % LDPE 4016 |
| Comparative 2 | 98 wt. % DOWLEX ™ 2045G | 2 wt. % LDPE 4016 |
| Comparative 3 | 98 wt. % SCLAIR ™ FP120 | 2 wt. % LDPE 4016 |
| Comparative A1 | 98 wt. % ENABLE ™ 35-05 | 2 wt. % MB-1 |
| Comparative A2 | 98 wt. % ENABLE ™ 35-05 | 2 wt. % LDPE 4016 |
| Comparative B1 | 98 wt. % EXCEED ™ 1018 | 2 wt. % MB-1 |
| Comparative B2 | 98 wt. % EXCEED ™ 1018 | 2 wt. % LDPE 4016 |
| Comparative C1 | 98 wt. % FLEXUS ™ 9212XP | 2 wt. % MB-1 |
| Comparative C2 | 98 wt. % FLEXUS ™ 9212XP | 2 wt. % LDPE 4016 |
| Comparative D1 | 98 wt. % TUFLIN ™ HS-7028 | 2 wt. % MB-1 |
| Comparative D2 | 98 wt. % TUFLIN ™ HS-7028 | 2 wt. % LDPE 4016 |

The masterbatch composition, MB-1, was produced on a ZSK-26 mm Coperian Co-rotating Twin Screw Extruder (TSE) under a nitrogen atmosphere. The extruder was an 11 barrel, 44 L/D electrically heated and water cooled machine with a maximum RPM of 1200. The LDPE 4016 was fed into barrel 1 via a K-Tron KQX gravimetric feeder at a rate of 60 lbs/hr. A FRG-1/Mineral oil solution (1:1) was injected via a 1000D ISCO syringe pump and back pressure injector valve into barrel 9 to give a target concentration of 1000 ppm of active FRG-1. The polymer melt was then fed through a transition piece, a polymer divert valve, and into the underwater 2 hole, 0.110 diameter die producing pellets at ~37 ct/g.

The masterbatch, MB-1, or the LDPE pellets were dry-blended with the LLDPE base resin pellets at a weight ratio of 2:98 and processed through a Haake Polylab Micro-18 twin-screw extruder using a feed rate of 1.2 lbs/h, a screw-speed of 100 rpm, and a six-zone heating profile of 140, 160, 180, 190, 200, 200° C. Fans at the exit die were used for cooling the strand. The processing through the Micro-18 twin-screw extruder was done under an air atmosphere. The pellets produced were submitted for melt-strength, DMS, and melt index characterization.

TABLE 6

Results

| | Δ Melt Strength | Δ Complex Viscosity @ 0.1 rad/s | Δ Melt Index |
|---|---|---|---|
| DOWLEX ™ NG2045B (inventive) | 2.03 | 6,162 | 0.274 |
| DOWLEX ™ 2045G (inventive) | 0.69 | 2,327 | 0.147 |
| SCLAIR ™ FP120 (inventive) | 1.09 | 2,430 | 0.171 |
| ENABLE ™ 35-05 (comparative) | −0.15 | 1,703 | 0.017 |
| EXCEED ™ 1018 (comparative) | 0.40 | 769 | 0.058 |
| FLEXUS ™ 9212XP (comparative) | −0.74 | −1,241 | 0.035 |
| TUFLIN ™ HS-7028 (comparative) | 0.35 | 503 | 0.038 |

Figure 2:
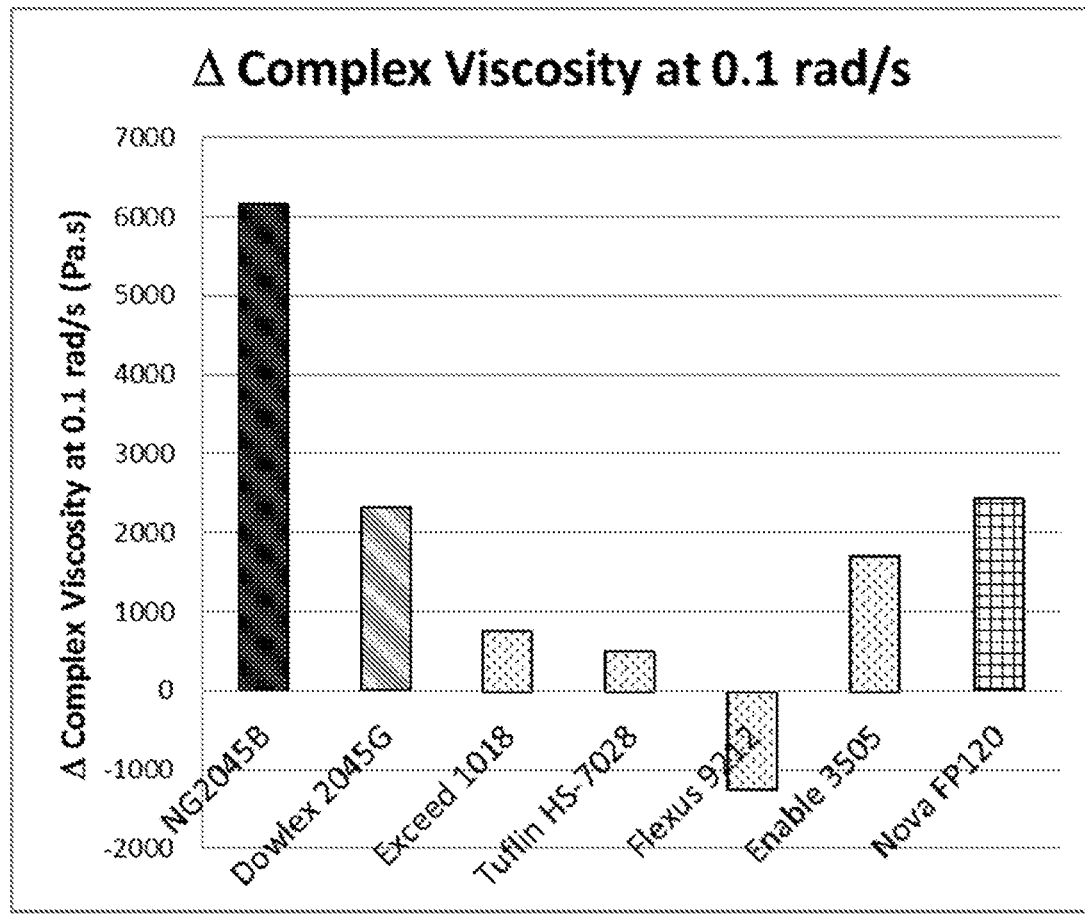
FIG. 2 graphically depicts the difference in complex viscosity at 0.1 rad/s between various free radical generator-modified polyethylene resins according to one or more embodiments shown and described herein and polyethylene resins that are not free radical generator-modified.
Figure 3:
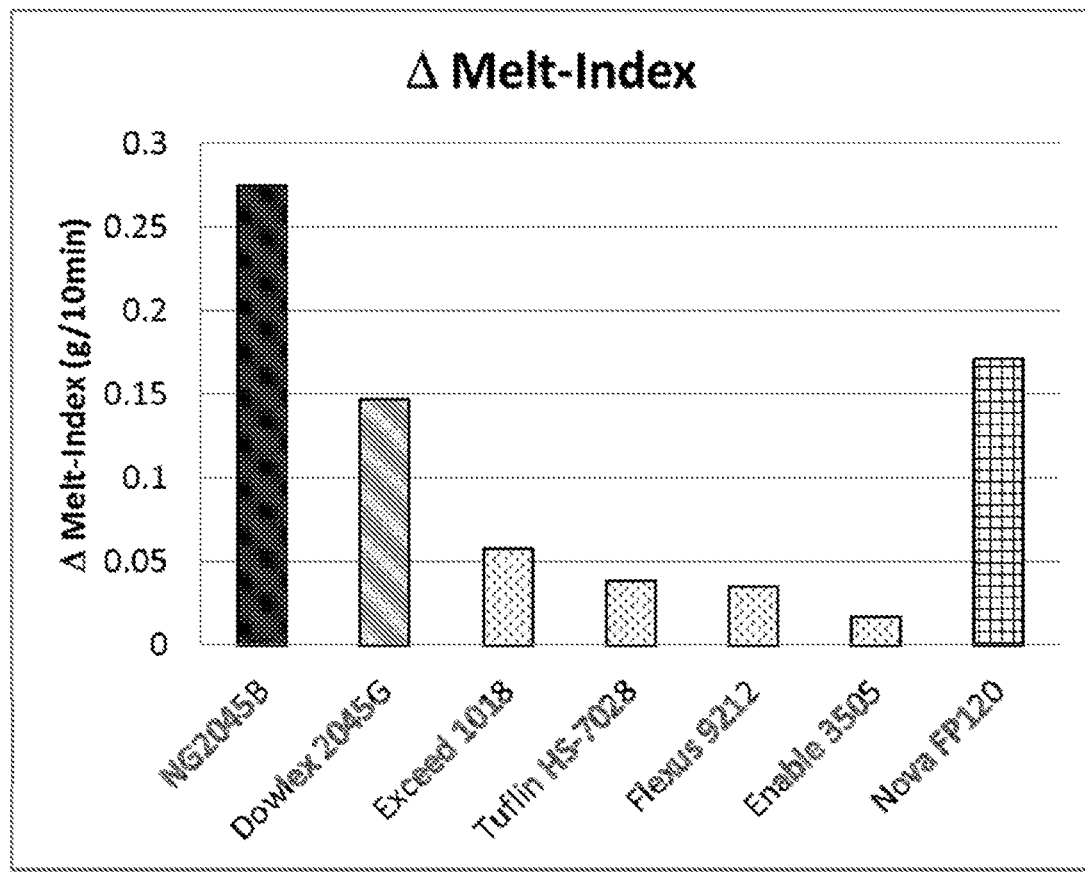
FIG. 3 graphically depicts the difference in melt index between various free radical generator-modified polyethylene resins according to one or more embodiments shown and described herein and polyethylene resins that are not free radical generator-modified.

In Table 6 and as shown in FIGS. 1-3, the difference in melt-strength, complex viscosity at 0.1 rad/s, and melt index values of the base resin with the free radical generator masterbatch (LLDPE (98%)+MB-1 (2%)) is compared to the values for the base resin with no free radical generator (LLDPE (98%)+LDPE (2%)). Note that for melt-index, the differences are multiplied by −1 to generate positive values. As shown in FIGS. 1-3, the LLDPE resins having a vinyl unsaturation of >0.2 unsaturated vinyl groups per 1000 total carbons give the greatest increase in melt-strength and complex viscosity at 0.1 rad/s, and the greatest decrease in melt-index. Also, where the primary antioxidant content is zero, the melt strength and complex viscosity at 0.1 rad/s is increased, and the melt-index is decreased compared to when the primary antioxidant content is higher.

TABLE 7

Comparison of Free Radical Generator Concentration - Formulations

| | Base Resin | Masterbatch |
|---|---|---|
| Inventive 4 | 98 wt. % DOWLEX ™ NG2045B | 2 wt. % MB-2 |
| Inventive 5 | 98 wt. % DOWLEX ™ NG2045B | 2 wt. % MB-3 |
| Inventive 6 | 98 wt. % DOWLEX ™ NG2045B | 2 wt. % MB-4 |
| Inventive 7 | 98 wt. % DOWLEX ™ NG2045B | 2 wt. % MB-5 |
| Inventive 8 | 98 wt. % DOWLEX ™ NG2045B | 2 wt. % MB-6 |
| Comparative E | 98 wt. % DOWLEX ™ NG2045B | 2 wt. % LDPE 4016 |
| Comparative F | 98 wt. % DOWLEX ™ NG2045B | 2 wt. % MB-7 |
| Comparative G | 98 wt. % DOWLEX ™ NG2045B | 2 wt. % MB-8 |
| Comparative H | 98 wt. % DOWLEX ™ NG2045B | 2 wt. % MB-9 |

Masterbatches MB-2 to MB-9 were prepared by first dispersing/coating the liquid radical generator over the LDPE pellets using a Flacktek mixer. This was followed by compounding the coated pellets on a Haake Polylab Micro-18 twin-screw-extruder under nitrogen with a feed-rate of 2.2 lbs/h, a screw-speed of 150 rpm, and a six-zone heating profile of 140, 150, 160, 170, 170, 170° C. The average residence time was approximately 1.5 minutes (from feed-throat to exit die). Fans at the exit die were used for cooling the strand. Passing the strand through the pelletizer produced small cylindrical pellets of masterbatch.

In order to avoid segregation of the small masterbatch pellets from larger LLDPE pellets and to avoid differences in melting rates between the pellets of different sizes, the larger LLDPE pellets were first passed through the Micro-18 twin-screw extruder under nitrogen, and under the same processing conditions as the masterbatch pellets to produce pellets of equivalent size to the masterbatch pellets. The masterbatch or the LDPE pellets were then dry-blended with the LLDPE base resin pellets at a weight ratio of 2:98 and processed through a Haake Polylab Micro-18 twin-screw extruder using a feed rate of 1.2 lbs/h, a screw-speed of 100 rpm, and a six-zone heating profile of 140, 160, 180, 190, 200, 200° C. Fans at the exit die were used for cooling the strand. The pellets produced were submitted for melt-strength and DMS characterization.

TABLE 8

Results

| | Complex Viscosity @ 0.1 rad/s (Pa · s) | Melt Strength (cN) |
|---|---|---|
| Inventive 4 | 12,838 | 4.99 |
| Inventive 5 | 15,383 | 5.56 |
| Inventive 6 | 16,854 | 5.86 |
| Inventive 7 | 20,126 | 6.40 |
| Inventive 8 | 34,201 | 7.71 |
| Comparative E | 9,442 | 4.00 |
| Comparative F | 10,102 | 4.06 |
| Comparative G | 12,418 | 4.60 |
| Comparative H | 15,612 | 5.70 |

Figure 4:
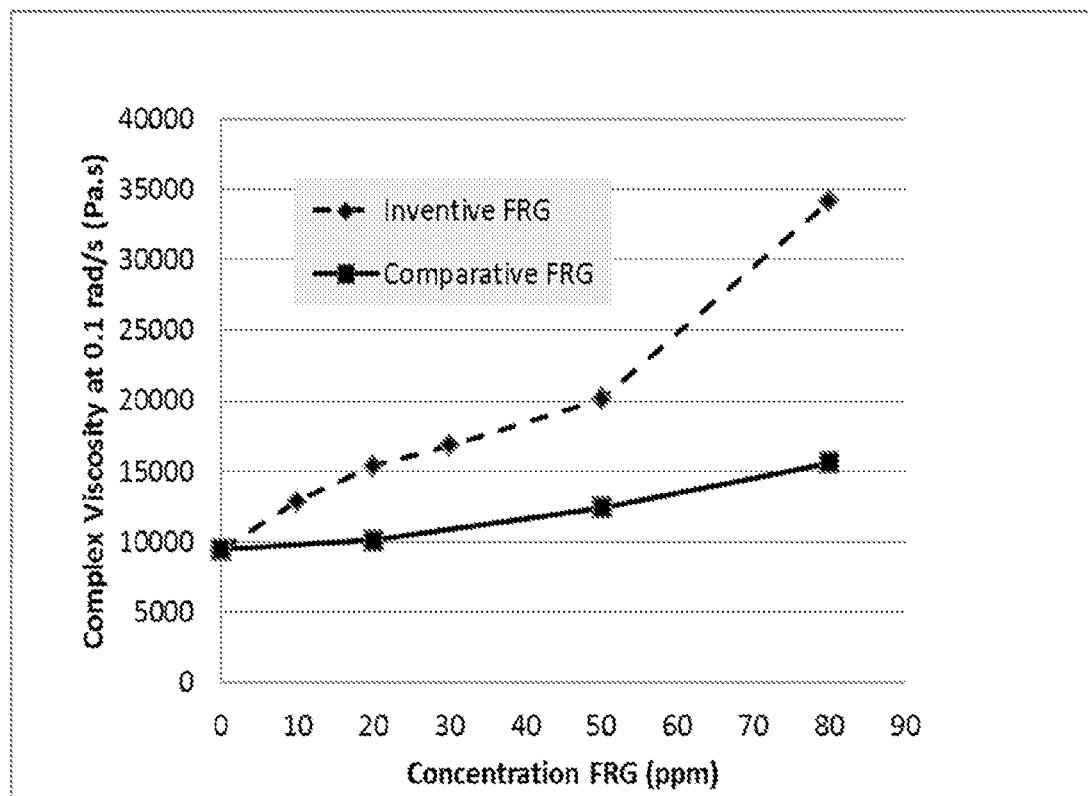
FIG. 4 graphically depicts the complex viscosity at 0.1 rad/s at various concentrations of inventive free radical generator according to one or more embodiments shown and described herein in comparison to a comparative free radical generator.
Figure 5:
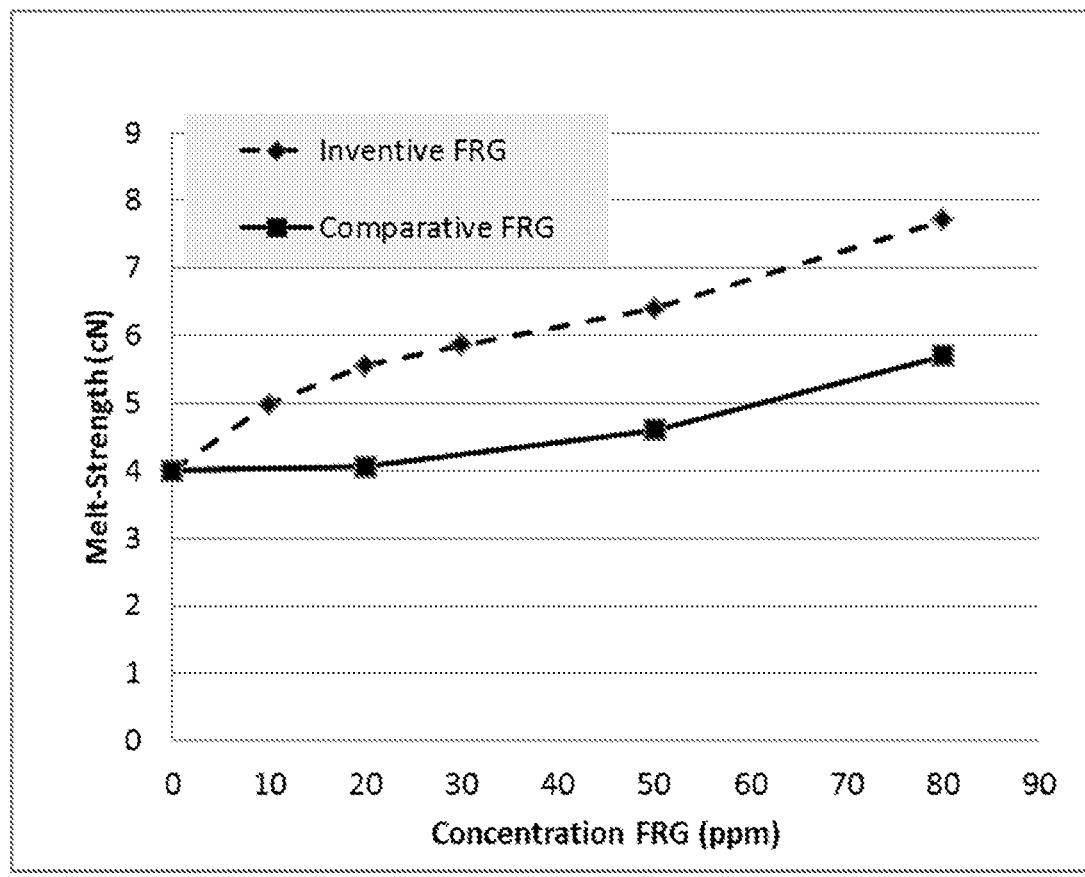
FIG. 5 graphically depicts the melt strength at various concentrations of inventive free radical generator according to one or more embodiments shown and described herein in comparison to a comparative free radical generator.

FIGS. 4 & 5 depict the complex viscosity at 0.1 rad/s and the melt strength improvement at different concentrations of the inventive free radical generator. Also depicted are the complex viscosity at 0.1 rad/s and melt strength at different concentrations of a comparative free radical generator. Both figures show the much higher performance of the inventive free radical generator versus the comparative free radical generator.

TABLE 9

Comparison of Free Radical Generators - Formulations

| | Base Resin | Masterbatch |
|---|---|---|
| Inventive 9 | 98 wt. % DOWLEX ™ NG2045B | 2 wt. % MB-3 |
| Comparative I | 98 wt. % DOWLEX ™ NG2045B | 2 wt. % MB-7 |
| Comparative J | 98 wt. % DOWLEX ™ NG2045B | 2 wt. % MB-10 |
| Comparative K | 98 wt. % DOWLEX ™ NG2045B | 2 wt. % LDPE 4016 |

Masterbatches MB-3, MB-7, and MB-10 were prepared by first dispersing/coating the liquid radical generator over the LDPE pellets using a Flacktek mixer. This was followed by compounding the coated pellets on a Haake Polylab Micro-18 twin-screw-extruder under nitrogen with a feed-rate of 2.2 lbs/h, a screw-speed of 150 rpm, and a six-zone heating profile of 140, 150, 160, 170, 170, 170° C. The average residence time was approximately 1.5 minutes (from feed-throat to exit die). Fans at the exit die were used for cooling the strand. Passing the strand through the pelletizer produced small cylindrical pellets of masterbatch.

In order to avoid segregation of the small masterbatch pellets from larger LLDPE pellets and to avoid differences in melting rates between the pellets of different sizes, the larger LLDPE pellets were first passed through the Micro-18 twin-screw extruder under nitrogen, and under the same processing conditions as the masterbatch pellets to produce pellets of equivalent size to the masterbatch pellets. The masterbatch or the LDPE pellets were then dry-blended with the LLDPE base resin pellets at a weight ratio of 2:98 and processed through a Haake Polylab Micro-18 twin-screw extruder using a feed rate of 1.2 lbs/h, a screw-speed of 100 rpm, and a six-zone heating profile of 140, 160, 180, 190, 200, 200° C. Fans at the exit die were used for cooling the strand. The pellets produced were submitted for melt-strength and DMS characterization.

TABLE 10

Results

| | Complex Viscosity @ 0.1 rad/s (Pa · s) | Melt Strength (cN) |
|---|---|---|
| Inventive 9 | 16,461 | 5.81 |
| Comparative I | 14,345 | 4.98 |
| Comparative J | 11,051 | 4.30 |
| Comparative K | 9,853 | 4.37 |

Figure 6:
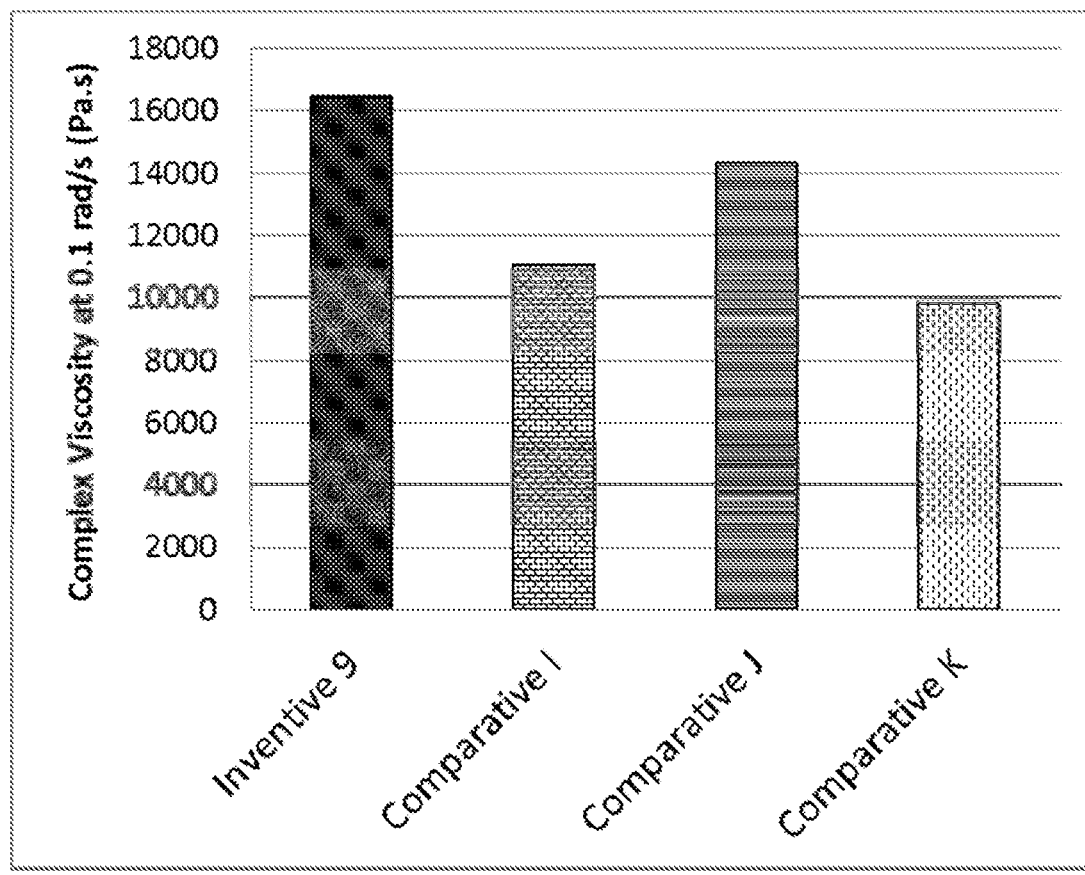
FIG. 6 graphically depicts the complex viscosity at 0.1 rad/s for polyethylene resins modified using an inventive free radical generator according to one or more embodiments shown and described herein in comparison to polyethylene resins modified using comparative free radical generators.
Figure 7:
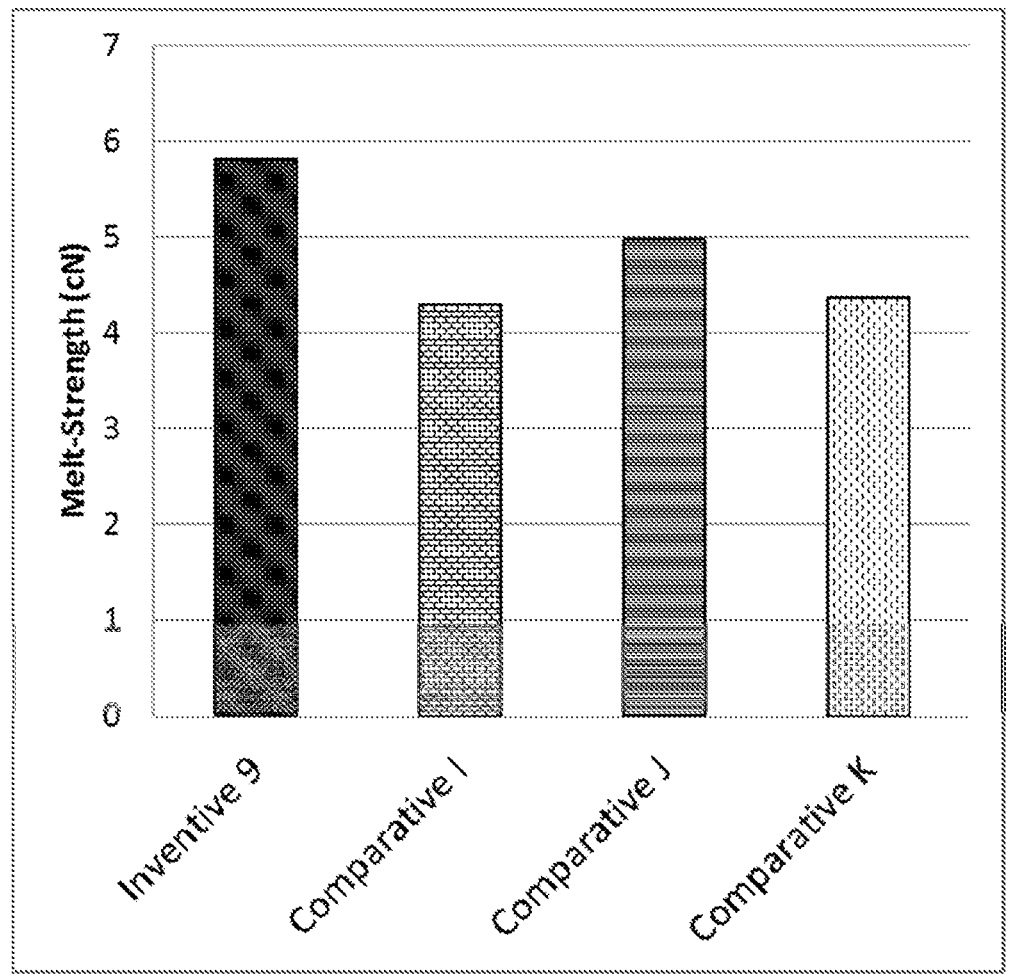
FIG. 7 graphically depicts the melt strength for polyethylene resins modified using an inventive free radical generator according to one or more embodiments shown and described herein in comparison to polyethylene resins modified using comparative free radical generators.

As shown in FIGS. 6 & 7, the complex viscosity at 0.1 rad/s and the melt strength are more enhanced using the inventive free radical generator than for the comparative free radical generators.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A method for increasing the melt strength and/or low shear viscosity of a polyethylene resin, the method comprising:
    a) providing a first polyethylene resin having a density ranging from 0.900 g/cm$^3$ to 0.970 g/cm$^3$, a melt index, ($I_2$), ranging from 0.01 g/10 min to 30 g/10 min, and at least 0.20 vinyl groups per 1,000 total carbons;
    b) providing a masterbatch composition comprising a free radical generator and a second polyethylene resin, wherein the free radical generator has a half-life at 220° C. of less than 200 seconds, and a decomposition energy higher than −250 kJ/mol, and wherein the second polyethylene resin has a density ranging from 0.900 g/cm$^3$ to 0.970 g/cm$^3$, and melt index, ($I_2$), ranging from 0.01 g/10 min to 100 g/10 min; and
    c) reacting the first polyethylene resin with the masterbatch composition to form a modified polyethylene resin.

2. The method of claim 1, wherein the amount of free radical generator is less than 30 ppm relative to the total amount of resin.

3. The method of claim 1, wherein the free radical generator has a half-life at 220° C. of between 60 seconds and 120 seconds.

4. The method of claim 1, wherein the masterbatch composition comprises less than 1,000 ppm of primary antioxidant.

5. The method of claim 1, wherein the first polyethylene resin comprises less than 2,000 ppm primary antioxidant.

6. The method of claim 1, wherein the first polyethylene resin comprises less than 250 ppm of primary antioxidant and the second polyethylene resin comprises less than 250 ppm of primary antioxidant.

7. The method of claim 1, wherein the molecular weight of the free radical generator is from 200-1,000 Daltons.

8. The method of claim 1, wherein the free radical generator is a cyclic peroxide.

9. The method of claim 1, wherein the reacting of the first polyethylene resin with the free radical generator takes place in an extruder.

10. A composition formed from the modified polyethylene resin obtained from the method of claim 1.

11. A film formed from the modified polyethylene resin obtained from the method of claim 1.

12. The film of claim 11, wherein the film is a blown film.

13. The film of claim 11, wherein the film is a cast film.

14. The film of claim 11, wherein the film is a multilayer film.

15. The film of claim 11, wherein the film is a monolayer film.

* * * * *